United States Patent [19]

Kroplinski et al.

[11] 4,125,545

[45] Nov. 14, 1978

[54] STABILIZED DIPHENYLMETHANE DIISOCYANATE PREPOLYMER

[75] Inventors: Thaddeus F. Kroplinski, Bound Brook; Melvin Brauer, East Brunswick, both of N.J.

[73] Assignee: N L Industries, Inc., New York, N.Y.

[21] Appl. No.: 836,834

[22] Filed: Sep. 26, 1977

Related U.S. Application Data

[63] Continuation-in-part of Ser. No. 706,528, Jul. 19, 1976, abandoned.

[51] Int. Cl.$^2$ .................... C09F 7/06; C07C 118/00; C08L 91/00
[52] U.S. Cl. ........................... 260/404.5; 260/18 TN; 260/453 A; 260/453 P; 528/67; 528/76; 528/81
[58] Field of Search ............... 260/18 TN, 77.5 AP, 260/404.5 I, 453 A, 453 P

[56] References Cited

U.S. PATENT DOCUMENTS

| | | | |
|---|---|---|---|
| 3,143,517 | 8/1964 | Heiss | 260/18 TN |
| 3,591,560 | 7/1971 | Wagner et al. | 260/75 NT |
| 3,790,508 | 2/1974 | Triolo | 260/75 NT |
| 3,925,319 | 12/1975 | Hiatt et al. | 260/75 NT |

FOREIGN PATENT DOCUMENTS 929,371 6/1963 United Kingdom ............ 260/77.5 AA

*Primary Examiner*—H.S. Cockeram
*Attorney, Agent, or Firm*—Malcolm L. Sutherland; Robert L. Holiday

[57] ABSTRACT

Liquid 4,4'diphenylmethane diisocyanate (MDI) prepolymers have been produced which remain fluid and do not crystallize at temperatures below 40° F. These prepolymers comprise the reaction product of a polyol, 4,4'diphenylmethane diisocyanate (MDI) and an aliphatic and/or cycloaliphatic diisocyanate. The polyol employed is selected from the group consisting of castor oil, polyoxypropylene glycol, polyhydric alcohol mono- and di-esters of hydroxyacids of at least 12 carbon atoms and mixtures thereof.

The reaction product contains the polyol in amount from about 10% to about 40%, the 4,4'diphenylmethane diisocyanate in amount from about 50% to about 70% and the aliphatic or cycloaliphatic isocyanate in amount from about 10% to about 20%. The prepolymer should be prepared such that the NCO/OH ratio should fall within the range of about 3 to about 7.

18 Claims, No Drawings

STABILIZED DIPHENYLMETHANE DIISOCYANATE PREPOLYMER

This application is a continuation-in-part of U.S. patent application Ser. No. 706,528, filed July 19, 1976 and now abandoned.

BACKGROUND OF THE INVENTION

Isocyanate terminated liquid prepolymers have been produced in the past and these prepolymers have been employed as one of the ingredients in two-package urethane casting resins. The other ingredient used to cure the propolymer contains active hydrogens such as hydroxyls or amines. These two package casting resin systems are particularly useful for potting, filling, embedding and encapsulating in the electrical and biomedical fields.

One particularly useful isocyanate terminated propolymer is the reaction product of 4,4'diphenylmethane diisocyanate, castor oil, and a polyoxypropylene glycol. This product has been prepared and successfully used commercially in the past. This composition, however, preferably must be held at a temperature above 40° F. until it is employed, since it tends to crystallize and must be heated above its melting point to return it to the liquid state.

Although prepolymers of other isocyanate compositions with polyols have been prepared, the instant invention, however, is concerned with MDI based prepolymers because of their desirable properties. These particular prepolymers are less toxic than other isocyanate based prepolymers such as 2,4 tolylene diisocyanate (TDI). They also react rapidly with polyols and the like to produce elastomers which possess superior mechanical properties combined with excellent heat and hydrolytic stability.

MDI prepolymers with NCO/OH ratios in the range of 3-7, however, preferably must be held at a temperature above 40° F. until they are employed, since they tend to crystallize and form a solid mass below this temperature.

It is, therefore, desirable to produce modified MDI prepolymers which not only possess the above mentioned desirable properties, but also are substantially non-crystallizing at temperatures below 40° F. and may even be non-crystallizing at 0° F.

SUMMARY OF THE INVENTION

A composition of matter has been produced comprising an isocyanate terminated liquid prepolymer which is prepared by reacting a polyol, 4,4'diphenylmethane diisocyanate (MDI) and a second diisocyanate selected from the group consisting of an aliphatic diisocyanate, or a cycloaliphatic diisocyanate and mixtures thereof. The polyol is selected from the group consisting of castor oil, polyoxypropylene glycol, polyhydric alcohol mono- and di-esters of hydroxyacids of at least 12 carbon atoms and mixtures thereof.

The polyol is present in amount from about 10% to about 40%, the 4,4'diphenylmethane diisocyante (MDI) in amount from about 50% to about 70% and the second isocyanate in amount from about 10% to about 20%, the reaction being carried otu at a NCO/OH ratio of from about 3 to about 7 to form a liquid product, all percentages being by weight.

The reaction product of this invention is a liquid which is stable at temperatures below 40° F. and in some instances as low as 0° F.

DESCRIPTION OF THE PREFERRED EMBODIMENTS

It has been discovered that the stability of the isocyanate terminated polyol prepolymer of the instant invention which contains from about 10% to about 40% of the polyol, from about 50% to about 70% MDI and from about 10% to about 20% of an aliphatic or cycloaliphatic isocyanate is superior to the MDI-polyol prepolymers prepared in the past.

Apparently, the presence of the two different isocyanates reacting simultaneously with the polyols produces a more stable prepolymer than that produced by separately forming the two polyol-isocyanate reaction products and then mixing the two reaction products or by merely adding the aliphatic or cycloaliphatic isocyanate to the MDI based prepolymer.

In order for the reaction product to form a stable liquid product, the NCO/OH ratio should be held between about 3 and about 7.

The aliphatic and/or cycloaliphatic diisocyanates employed in this invention preferably include those which have at least 6 carbon atoms, exclusive of the NCO groups. The most useful of these compounds are those which are commercially readily available such as 3-isocyanatomethyl-3,5,5-trimethyl-cyclohexylisocyanate (IPDI), 4,4'dicyclohexylmethane diisocyanate, 1,6 hexamethylene diisocyanate, the biuret of 1,6 hexamethylene diisocyanate, trimethyl hexamethylene diisocyanate and a long chain aliphatic diisocyanate having the formula NCO—[D]—NCO where D is a 36 carbon hydrocarbon radical.

Glycol and polyglycol and other polyhydric alcohol mono and diesters of hydroxyacids of at least 12 carbon atoms useful in this invention are prepared by reacting polyhydric lower aliphatic alcohols (di, tri and higher alcohols) or ether alcohols such as ethylene glycol, glycerine, propylene glycol, hexamethylene glycol and polyethylene and polypropylene glycols with the acid according to procedures well known in the prior art such as direct esterification. The hydroxy carboxylic acids may be saturated or unsaturated. Illustrative of this class of hydroxy acids are the following: ricinoleic acid, 12-hydroxy stearic acid, hydroxy pentadecanoic acid, hydroxy palmitic acid, hydroxy myristic acid, hydroxy docosanoic acid, hydroxy cerotic acid, etc. The length of the carbon chain of the hydroxy acid is limited to the extent that commercially there are available carboxylic acids having about 22 carbon atoms.

Preferred esters for use in this invention are propylene glycol monoricinoleate, ethylene glycol monoricinoleate and propylene glycol 12-hydroxystearate. Among other esters which are useful in the preparation of the prepolymers are diethylene glycol monoricinoleate, glyceryl mono and di-ricinoleates, polyethylene glycol monoricinoleate, dipropylene glycol 12-hydroxystearate, propylene glycol hydroxy palmitic, etc.

The reaction products are prepared in a simple and economical manner. The process is described as follows:

The polyol is admixed with stirring with the MDI and the other isocyanate at substantially room temperature. The mixture is then heated to about 100° F. to 200° F preferably between 140° F and 180° F. The mixture is then held at that temperature for 1 to 8 hours to complete the reaction. The entire operation is carried out under a nitrogen atmosphere. After the reaction is complete, the propolymer is placed in a drum under nitrogen for storage.

In order to describe this invention more clearly, the following examples are presented:

EXAMPLE 1

A mixture of 204 grams of a 400 molecular weight polyoxypropylene glycol, 205 grams of castor oil, 614 grams of 4,4' diphenylmethane diisocyanate (MDI) and 181 grams of 3-isocyanatomethyl-3,5,5-trimethyl-cyclohexylisocynate (IPDI) were added to a reactor. The temperature was raised to 75° C. and maintained at 70°–80° C. for 4 hours. The resulting prepolymer had an NCO content of 17.37%. The entire reaction was carried out under nitrogen. The NCO/OH ratio was 4.2/1.

The reacted product remained stable as a liquid for more than 150 days when maintained at 40° F. and remained stable for more than 60 gays at 0° F. The operational details and the results obtained are recorded in the Table. Polyoxypropylene glycol and castor oil can be used alone, if desired, to obtain stable prepolymer.

EXAMPLE 2

For comparative purposes this propolymer was prepared as a control for Example 1, and was made under the conditions described in Example 1, except that the reaction was maintained at 70°–80° C. for 2 hours and no second isocyanate was employed. The ingredients used were: 614 grams MDI; 296 grams castor oil, and 294 grams of a 2000 molecular weight polyoxypropylene glycol (PPG). The prepolymer had an NCO content of 12.71% and a NCO/OH ratio of 4.2/1. This control remained stable at 40° F. for only 3 days and stable at 0° F. for only 1 day.

EXAMPLE 3-6

In Examples 3 and 5 using the same procedure of Example 1 the propolymers were made with various amounts of ingredients of the polyoxypropylene glycol (PPG), the MDI and the IPDI.

Examples 4 and 6 were prepared as controls for Examples 3 and 5. In these controls no IPDI was employed. The results are recorded in the Table.

It should be noted in the Table that the stability of Example 3 was greater than Example 4. In Examples 5 and 6, the product remained as a liquid for more than 40 days in Example 5, while in Example 6 the product turned solid almost immediately.

EXAMPLES 7 AND 7a

These examples were run to show the superiority of reacting the three ingredients simultaneously (Example 7) with one another instead of reacting the MDI with the polyoxypropylene glycol at 70°–80° C. for 2 hours and then adding the IPDI and reacting the mixture for another 2 hours at the same temperature (Example 7a).

As recorded in the Table the product of Example 7 remained stable at 40° F. for 14 days and stable at 0° F. for 11 days, while the product of Example 7a turned solid at 25° F. in 2 hours.

EXAMPLES 8-13

In these examples various isocyanates were substituted for the IPDI used in Examples 1, 3 and 5 as follows:

Example

8 — 4,4'dicyclohexylmethane diisocyanate ($H_{12}$MDI)
9 — biuret of 1,6 hexamethylene diisocyanate (Bu-HMDI)
10 — 1,6 -hexamethylene diisocyanate (HMDI)
11 — aliphatic diisocyanate having the formula NCO-[D]-NCO where D is a 36 carbon hydrocarbon radical (DDI)
12 — 1:1 blend of 2,2,4-trimethyl-hexamethylene diisocyanate and 2,4,4-trimethyl-hexamethylene diisocyanate (TMHMDI)

In Example 13 a control was prepared which contained no other isocyanate except the MDI.

Again, stability was obtained in these examples except in Example 13 which turned solid within a few minutes.

The operational details and results obtained in all of these examples are recorded in the Table.

EXAMPLES 14-17

Examples 14–17 illustrate the application of the invention in making stable MDI based prepolymers of esters of polyhydric alcohols and carboxylic acids having at least 12 carbon atoms as exemplified by ethylene glycol monoricinoleate. In Example 14 the proceduure of Example 1 was used to make the prepolymer using ethylene glycol monoricinoleate (NL Industries POLYCIN 53), MDI and IPDI. The overall NCO/OH employed was 7/1; the NCO/OH ratio exclusive of the 20% IPDI used was 5.1/1. In Examples 15–17 control prepolymers were made with only MDI and ethylene glycol monoricinoleate at NCO/OH ratios of 7/1 – 2.5/1. To illustrate that even at NCO/OH ratios as low as 2.5/1 the controls had significantly worse low temperature stability than the prepolymer made in Example 14. The details and results of Example 14 to 17 are recorded in the Table.

Similar results will be obtained using propylene glycol monoricinoleate or propylene glycol 12-hydroxy stearate in place of the ethylene glycol monoricinoleate.

From the above description and by the Examples presented, it has clearly been shown that when 4,4 diphenylmethane diisocyanate is reacted with a polyol and an aliphatic or cycloaliphatic diisocyanate that the reaction product remains stable as a liquid and is substantially non-crystallizing at temperatures below 40° F.

These prepolymers are particularly useful in preparing polyurethanes for potting, filling, embedding and encapuslating electrical components and biomedical substances. In addition, these prepolymers also may be used to prepare relatively low viscosity, high solids or solventless polyurethane adhesives and coatings.

While this invention has been described and illustrated by the examples shown, it is not intended to be strictly limited thereto, and other variations and modifications may be employed within the scope of the following claims.

TABLE

EXAMPLES

| INGREDIENTS: | 1 | 2 | 3 | 4 | 5 | 6 | 7 | 7a | 8 | 9 | 10 | 11 | 12 | 13 | 14 | 15 | 16 | 17 |
|---|---|---|---|---|---|---|---|---|---|---|---|---|---|---|---|---|---|---|
| | | Control | | Control | | Control | | Control | | | | | | Control | | | | |
| Castor Oil (gm) | 205 | | | | | | | | | | | | | | 215.8 | 215.8 | 215.8 | 215.8 |
| Ethyleneglycol | | | | | | | | | | | | | | | | | | |
| Monoricinoleate | | | | | | | | | | | | | | | | | | |
| PPG (gm) | 204 | 296 | 108 | 148 | 40 | 120 | 40 | 40 | 40 | 40 | 40 | 40 | 40 | 120 | | | | |
| PPG (mw) | 400 | | 273 | 440 | 135 | 535 | 189 | 189 | 200 | 200 | 180 | 222 | 187 | 750 | 637.5 | 875.0 | 637.5 | 322.2 |
| MDI (gm) | 614 | 294 | 252 | 252 | 280 | 280 | 280 | 280 | 280 | 280 | 280 | 280 | 280 | 280 | 211.1 | | | |
| IPDI (gm) | 181 | 2000 | 40 | | 80 | | 80 | 80 | 80 | 80 | | | | | | | | |
| H₁₂MDI (gm) | | 614 | | | | | | | | | | | | | | | | |
| BU-HMDI (gm) | | | | | | | | | | | | | 80 | | | | | |
| HMDI (gm) | | | | | | | | | | | 80 | | | | | | | |
| DDI (gm) | | | | | | | | | | | | | | | | | | |
| TMHMDI (gm) | | | | | | | | | | | | 80 | | | | | | |
| NCO/OH | 4.2/1 | 4.2/1 | 3.0/1 | 3.0/1 | 5.0/1 | 5.0/1 | 7.0/1 | 7.0/1 | 7.0/1 | 7.0/1 | 7.0/1 | 7.0/1 | 7.0/1 | 7.0/1 | 7.0/1 | 7.0/1 | 5.1/1 | 2.5/1 |
| State at 77° F. | LIQ | LIQ | LIQ | LIQ | LIQ | SOLID | LIQ | SOLID | LIQ | LIQ | LIQ | LIQ | LIQ | SOLID | LIQ | SOLID | LIQ | LIQ |
| Time to Crystallize Days at 40° F | >150 | 3 | >150 | 30 | >40 | | 14 | | 5 | 2 | 14 | 0.5 | >40 | | (>14) | | 0.75 | 10 |
| Time to Crystallize Days at 0° F. | >60 | 1 | >60 | 10 | 11 | | 5 | | 1 | 0.1 | 0.1 | 0.1 | 0.3 | | (>14) | | 0.75 | 3 |

We claim:

1. A prepolymer stable at temperatures below 40° F. comprising the product of the simultaneous reaction of a polyol, 4,4,'diphenylmethane diisocyanate, and a second diisocyanate selected from the group consisting of aliphatic diisocyanate, cycloaliphatic diisocyanate and mixtures thereof, said polyol selected from the group consisting of castor oil and polyoxypropylene glycol, said polyol present in amount from about 10% to about 40%, said 4,4'diphenylmethane diisocyanate present in amount from about 50% to about 70% and said second diisocyanate present in amount from about 10% to about 20%, all of the percentages expressed on a weight basis, the reaction being carried out at a NCO/OH ratio from about 3 to about 7.

2. Prepolymer according to claim 1 in which the second diisocyanate is 3-isocyanatomethyl-3,5,5-trimethyl-cyclohexyl isocyanate.

3. Prepolymer according to claim 1 in which the second diisocyanate is 4,4'dicyclohexylmethane diisocyanate.

4. Prepolymer according to claim 1 in which the second diisocyanate is 1,6 hexamethylene diisocyanate.

5. Prepolymer according to claim 1 in which the second diisocyanate is the biuret of 1,6-hexamethylene diisocyanate.

6. Prepolymer according to claim 1 in which the second diisocyanate is trimethyl hexamethylene diisocyanate.

7. A process for producing a prepolymer which is stable at temperature below 40° F. which comprises admixing a polyol, 4,4'diphenylmethane diisocyanate, and a second diisocyanate selected from the group consisting of aliphatic diisocyanate and mixtures thereof, said polyol selected from the group consisting of castor oil and polyoxypropylene glycol, and heating said mixture to a temperature of about 100° F. to 200° F. and holding said mixture at that temperature for a period of about 1 to 8 hours to complete the reaction and cooling the prepolymer formed, said polyol present in amount from about 10% to about 40%, said 4,4'diphenylmethane diisocyanate present in amount from about 50% to about 70% and said second diisocyanate present in amount from about 10% to about 20%, all of the percentages expressed on a weight basis, the reaction being carried out at a NCO/OH ratio from about 3 to about 7.

8. Process according to claim 7 in which the process is carried out under a nitrogen atmosphere.

9. A prepolymer stable at temperatures below 40° F. comprising the product of the simultaneous reaction of a polyol, 4,4'diphenylmethane diisocyanate, and a second diisocyanate selected from the group consisting 3-isocyanatomethyl-3,5,5-trimethylcyclohexyl isocyanate, 4,4'dicyclohexylmethane diisocyanate, 1,6 hexamethylene diisocyanate, biuret of 1,6 hexamethylene diisocyanate and trimethyl hexamethylene diisocyanate, said polyol selected from the group consisting of castor oil and polyoxypropylene glycol, said polyol present in amount from about 10% to about 40%, said 4,4'diphenylmethane diisocyanate present in amount from about 50% to about 70% and said second diisocyanate present in amount from about 10% to about 20%, all of the percentages expressed on a weight basis, the reaction being carried out at a NCO/OH ratio from about 3 to about 7.

10. A process for producing a prepolymer which is stable at temperatures below 40° F. which comprises admixing a polyol, 4,4'diphenylmethane diisocyanate, and a second diisocyanate selected from the group consisting of 3-isocyanatomethyl-3,5,5-trimethylcyclohexyl isocyanate, 4,4'-discyclohexylmethane diisocyanate, 1,6 hexamethylene diisocyanate, biuret of 1,6 hexamethylene diisocyanate and trimethyl hexamethylene diisocyanate, said polyol selected from the group consisting of castor oil and polyoxypropylene glycol, said polyol present in amount from about 10% to about 40%, said 4,4' diphenylmethane diisocyanate present in amount from about 50% to about 70% and said second diisocyanate present in amount from about 10% to about 20%, all of the percentages expressed on a weight basis, and heating said mixture at a temperature of about 100° F. to about 200° F. and holding said mixture at that temperature for a period of about 1 to 8 hours to complete the reaction, and cooling the prepolymer formed, the reaction being carried out at a NCO/OH ratio from about 3 to about 7.

11. A prepolymer stable at temperature below 40° F comprising the product of the simultaneous reaction of a polyol, 4,4'diphenylmethane diisocyanate, and a second diisocyanate selected from the group consisting of aliphatic diisocyanate, cycloaliphatic diisocyanate and mixtures thereof, said polyol selected from the group consisting of castor oil, polyoxypropylene glycol, polyhydric alcohol mono- and di-esters of hydroxyacids of at least 12 carbon atoms and mixtures thereof, said polyol present in amount from about 10% to about 40%, said 4,4'diphenylmethane diisocyanate present in amount from about 50% to about 70% and said second diisocyanate present in amount from about 10% to about 20%, all of the percentages expressed on a weight basis, the reaction being carried out a a NCO/OH ratio from about 3 to about 7.

12. Prepolymer according to claim 11 in which the second diisocyanate is 3-isocyanatomethyl-3,5,5-trimethyl-cyclohexyl isocyanate.

13. Prepolymer according to claim 11 in which the second diisocyanate is 4,4'dicyclohexylmethane diisocyanate.

14. Prepolymer according to claim 11 in which the second diisocyanate is 1,6 hexamethylene diisocyanate.

15. Prepolymer according to claim 11 in which the second diisocyanate is the biuret of 1,6 hexamethylene diisocyanate.

16. Prepolymer according to claim 11 in which the second diisocyanate is trimethyl hexamethylene diisocyanate.

17. A process for producing a prepolymer which is stable at temperatures below 40° F. which comprises admixing a polyol, 4,4' diphenylmethane diisocyanate, and a second diisocyanate selected from the group consisting of aliphatic diisocyanate, cycloaliphatic diisocyanate and mixtures thereof, said polyol selected from the group consisting of castor oil, polyoxypropylene glycol, polyhydric alcohol mono- and di-esters of hydroxy acids of at least 12 carbon atoms and mixtures thereof, and heating said mixture to a temperature of about 100° F. to 200° F. and holding said mixture at that temperature for a period of about 1 to 8 hours to complete the reaction and cooling the prepolymer formed, said polyol present in amount from about 10% to about 40%, said 4,4'diphenylmethane diisocyanate present in amount from about 50% to about 70% and said second diisocyanate present in amount from about 10% to about 20%, all of the percentages expressed on a weight basis, the reaction being carried out at a NCO/OH ratio from about 3 to about 7.

18. A prepolymer stable at temperatures below 40° F. comprising the product of the simultaneous reaction of a polyol, 4,4'diphenylmethane diisocyanate, and a second diisocyanate selected from the group consisting of 3-isocyanatomethyl-3,5,5-trimethylcyclohexyl isocyanate, 4,4'dicyclohexylmethane diisocyanate, 1,6 hexamethylene diisocyanate, biuret of 1,6 hexamethylene diisocyanate, and trimethyl hexamethylene diisocyanate, said polyol selected from the group consisting of castor oil, polyoxypropylene glycol, ethylene glycol monoricinoleate, propylene glycol monoricinoleate, propylene glycol 12-hydroxystearate and mixtures thereof, said polyol present in amount from about 10% to about 40%, said 4,4'diphenylmethane diisocyanate present in amount from about 50% to about 70% and said second diisocyanate present in amount from about 10% to about 20%, all of the percentages expressed on a weight basis, the reaction being carried out at a NCO-/OH ratio from about 3 to about 7.

* * * * *